(12) United States Patent
Larsen

(10) Patent No.: US 9,133,958 B2
(45) Date of Patent: Sep. 15, 2015

(54) MANUAL OVERRIDES FOR VALVES

(75) Inventor: Todd William Larsen, Milaca, MN (US)

(73) Assignee: TESCOM CORPORATION, Elk River, MN (US)

( * ) Notice: Subject to any disclaimer, the term of this patent is extended or adjusted under 35 U.S.C. 154(b) by 741 days.

(21) Appl. No.: 13/364,096

(22) Filed: Feb. 1, 2012

(65) Prior Publication Data
US 2013/0193357 A1 Aug. 1, 2013

(51) Int. Cl.
F16K 31/143 (2006.01)
F16K 35/10 (2006.01)
F16K 31/122 (2006.01)

(52) U.S. Cl.
CPC ........... *F16K 31/143* (2013.01); *F16K 31/1221* (2013.01); *F16K 35/10* (2013.01)

(58) Field of Classification Search
USPC ........ 251/14, 63.4, 90, 92, 93, 101, 102, 103, 251/104, 105, 106, 111, 112, 113, 25, 32; 70/175, 176, 177, 178, 179, 180, 182, 70/183, 187
See application file for complete search history.

(56) References Cited

U.S. PATENT DOCUMENTS

| | | | |
|---|---|---|---|
| 1,275,041 A * | 8/1918 | Kiesel, Jr. | .......................... 251/14 |
| 2,678,799 A * | 5/1954 | St Clair | ............................ 251/14 |
| 3,729,168 A | 4/1973 | Natho et al. | |
| 4,306,586 A | 12/1981 | Spencer | |
| 5,370,359 A * | 12/1994 | Sadegh et al. | .................. 251/276 |
| 6,082,393 A * | 7/2000 | Tye | ........................... 137/315.27 |
| 6,691,980 B2 | 2/2004 | Larsen et al. | |
| 7,357,368 B2 * | 4/2008 | Takeda et al. | ................... 251/93 |
| 7,658,366 B2 | 2/2010 | Larsen | |
| 2003/0116732 A1 | 6/2003 | Chatufale | |

OTHER PUBLICATIONS

Patent Cooperation Treaty, "International Search Report," issued in connection with Application No. PCT/US2013/023739, May 14, 2013, 2 pages.
Patent Cooperation Treaty, "Written Opinion of the International Searching Authority," issued in connection with Application No. PCT/US2013/023739, May 14, 2013, 7 pages.

* cited by examiner

*Primary Examiner* — Kevin Murphy
*Assistant Examiner* — Jonathan Waddy
(74) *Attorney, Agent, or Firm* — Hanley, Flight & Zimmerman, LLC

(57) ABSTRACT

Manual overrides for valves are disclosed herein. An example apparatus includes an actuator to move a stem of a valve. The actuator includes a housing defining a bore and a piston disposed in the bore. The example apparatus also includes a rod movably coupled to the housing to extend into the bore, and the piston is to be movable via the rod or a fluid to flow into the bore. The example apparatus also includes a lock to hold the rod in a first position on the housing where the rod is to disable a supply of the fluid to the bore.

20 Claims, 4 Drawing Sheets

MANUAL OVERRIDES FOR VALVES

FIELD OF THE DISCLOSURE

This disclosure relates generally to valves and, more particularly, to manual overrides for valves.

BACKGROUND

Process control systems generally use a variety of process control devices (e.g., rotary valves, linear valves, etc.) to control a process. The process control devices are often operated by an actuator via a stem or shaft. For example, a poppet valve often includes a tapered plug coupled to a stem. Generally, a piston moves the plug via the stem into and away from a seat. The poppet valve may include a spring to urge the plug toward a position such as, for example, a fully closed position.

SUMMARY

An example apparatus includes an actuator to move a stem of a valve. The actuator includes a housing defining a bore and a piston disposed in the bore. The example apparatus further includes a rod movably coupled to the housing to extend into the bore, and the piston is to be movable via a fluid to flow into the bore or the rod. The example apparatus also includes a lock to hold the rod in a first position on the housing where the rod is to disable a supply of the fluid to the bore.

Another example apparatus includes a housing defining a bore and an inlet fluidly coupled to the bore. A piston is disposed in the bore and coupled to a stem of a valve. The example apparatus further includes a choke movably coupled to the housing. The choke is to extend through a portion of the housing and into the bore, and adjusting a position of the choke enables the choke to prevent fluid flow from the inlet to the bore or adjust a position of the piston.

Another example apparatus includes means for moving a stem of a valve. The means for moving is disposed in a bore. The example apparatus further includes means for actuating the means for moving, and the means for moving is to be movable via a fluid to flow into the bore or the means for actuating. The example apparatus also includes means for holding the means for actuating in a position relative to the bore where the means for actuating is to disable a supply of the fluid to the bore.

DETAILED DESCRIPTION

Process control systems generally use a variety of process control devices (e.g., rotary valves, linear valves, etc.) to control a process. For example, a shutoff valve such as a poppet valve often includes a tapered plug coupled to a stem. Generally, a piston actuator moves the plug via a piston coupled to the stem. The poppet valve may include a spring compressed between a seat and the piston to urge the piston and, thus, the stem and the plug toward a position such as, for example, a fully-closed or fully-open position. Typically, a pressure is applied to the piston via a fluid to move the piston against a force of the spring. If a supply of the fluid is blocked or depleted, the spring moves the piston and, thus, the stem and the plug to the fully-closed or the fully-open position.

The example apparatus disclosed herein enable an operator to manually control a valve when a supply of fluid is shut off, blocked, or otherwise insufficient to enable proper operation of the valve. The example apparatus disclosed herein may also be used to disable the supply of the fluid to the valve. An example apparatus includes an actuator to move a stem of the valve. The actuator includes a housing defining a bore and a piston disposed in the bore. The example apparatus further includes a rod movably coupled to the housing to extend into the bore. The piston is to be movable via the fluid to flow into the bore or the rod. The rod is movable to a first position on the housing where the rod is to disable the supply of fluid. The example apparatus also includes a lock to hold the rod in the first position. In some examples, the rod is movable to a second position where the rod enables the supply of the fluid to the bore, and the rod may be movable to a third position where the rod is operatively coupled to the piston.

Figure 1:
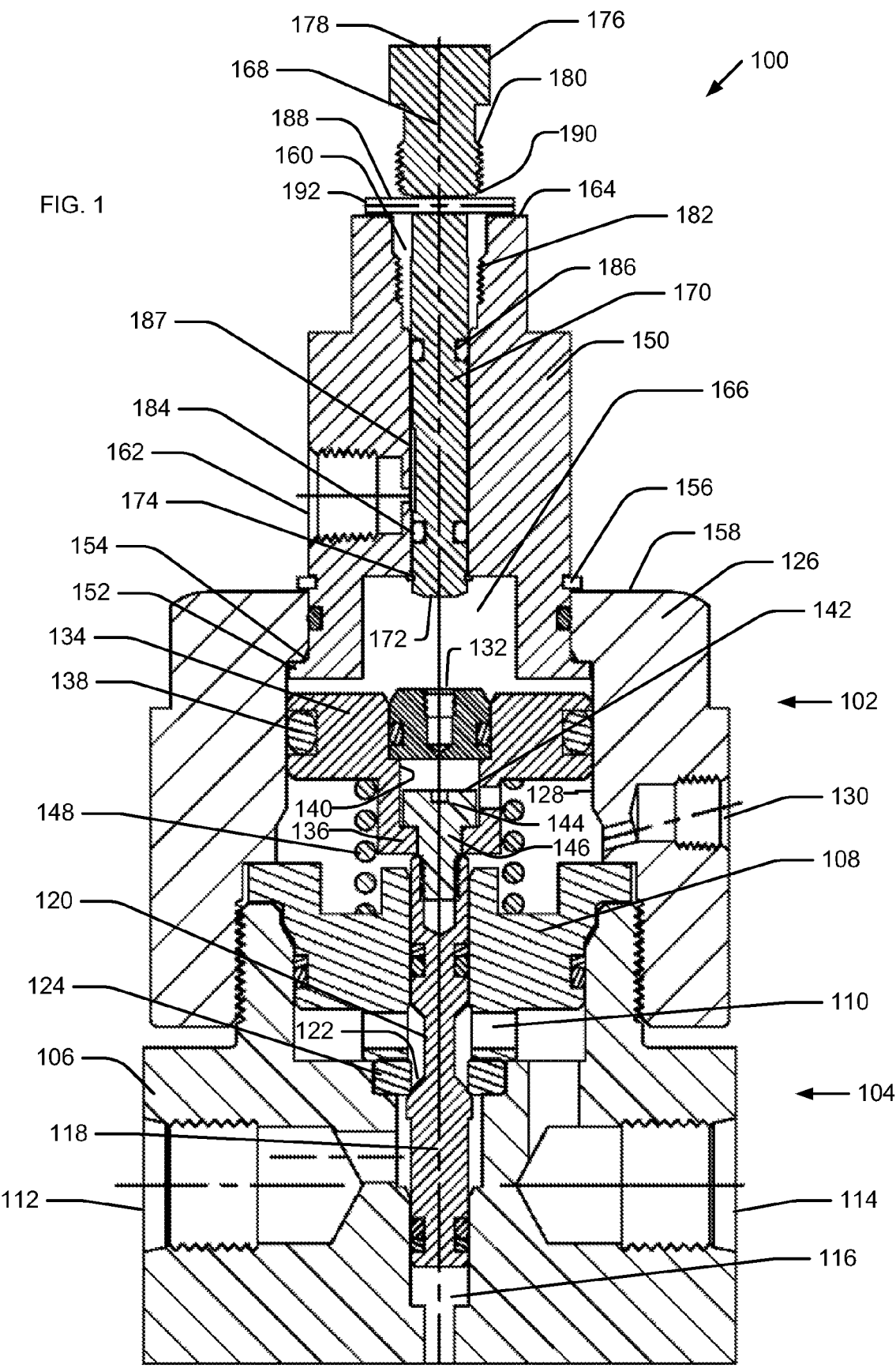
FIG. 1 depicts a cross-sectional view of an example process control device including an example apparatus with a choke in a first position.

FIG. 1 illustrates an example process control device 100 including an example actuator assembly 102 and an example valve 104. In the illustrated example, the valve 104 is a bi-directional flow valve (e.g., a TESCOM™ VA valve, a TESCOM™ VG valve, etc.). The example valve 104 includes a valve body 106 coupled to a valve insert 108 to define a fluid flow passageway 110 between an inlet 112 and an outlet 114. The valve body 106 and the valve insert 108 also define a bore 116 intersecting the fluid flow passageway 110. A stem 118 to control a fluid flow through the fluid flow passageway 110 is disposed in the bore 116. The stem 118 includes a neck 120 adjacent a plug 122. The neck 120 has a diameter less than a diameter of the plug 122. In the illustrated example, the plug 122 is an outwardly tapered or frustoconical surface of the stem 118 adjacent a bottom of the neck 120 in the orientation of FIG. 1. A valve seat 124 is disposed above the plug 122 in the orientation of FIG. 1 at the intersection of the fluid flow passageway 110 and the bore 116. The valve seat 124 is coupled to the valve body 106 via the valve insert 108. In the illustrated example, the plug 122 is seated against the valve seat 124 to form a fluid seal between the plug 122 and the valve seat 124.

The example actuator assembly 102 is coupled to the valve 104. In the illustrated example, the actuator assembly 102 includes a housing 126 threadably coupled to the valve body 106. In such examples, the valve insert 108 is coupled to the valve body 106 via the housing 126. The housing 126 defines a piston bore 128 and a vent or exhaust outlet 130. A piston 132 is disposed in the piston bore 128 and coupled to the stem 118 of the valve 104. For example, the piston 132 includes a driven portion 134 and a driving portion 136. The driven portion 134 includes a seal 138 to form a fluid seal between the piston bore 128 and the piston 132. The driving portion 136 extends toward the valve 104 from the driven portion 134. The driving portion 136 includes an aperture 140. A fastener 142 (e.g., a bolt, a shoulder screw, etc.) extends through the aperture 140 and is threaded into the stem 118. In the illustrated example, a head 144 of the fastener 142 is supported by the driving portion 136, and a shank 146 of the fastener 142 is free to slide in the aperture 140 of the driving portion 136. Thus, during operation, when the piston 132 moves toward the valve 104, the driving portion 136 pushes an end of the stem 118 to move the plug 122 away from the valve seat 124, and when the piston 132 moves away from the valve 104, the driving portion 136 pulls the head 144 of the fastener 142 to move the plug 122 toward the valve seat 124.

In the illustrated example, a spring 148 is compressed between the driven portion 134 of the piston 132 and the valve insert 108 to urge the piston 132 away from the valve 104 and, thus, the plug 122 of the stem 118 toward the valve seat 124. Therefore, the example valve 104 is a normally-closed valve. In some examples, the example actuator assembly 102 is coupled to a normally-open valve.

In the illustrated example, a bonnet 150 is coupled to the housing 126. To secure the example bonnet 150 to the housing 126, the example bonnet 150 includes a first lip 152 to engage a second lip 154 of the housing 126 and a retainer clip 156 to engage an exterior surface 158 of the housing 126. Thus, in the illustrated example, translational movement of the bonnet 150 relative to the housing 126 is prevented by the first lip 152 and the retainer clip 156, but the bonnet 150 is free to rotate relative to the housing 126.

The bonnet 150 defines an aperture 160 and an inlet 162 extending into the aperture 160. The aperture 160 extends from an exterior surface 164 of the bonnet 150 to the piston bore 128. Thus, the inlet 162 is fluidly coupled to the piston bore 128 via a portion of the aperture 160. In the illustrated example, the bonnet 150 also defines a counterbore 166 at an end of the aperture 160 adjacent the piston bore 128. During operation, the inlet 162 receives a fluid (e.g., air, oil, etc.) from a fluid supply line (not shown). In the illustrated example, the bonnet 150 may be rotated relative to the housing 126 to align the inlet 162 with the fluid supply line.

An example choke 168 is movably coupled to the bonnet 150. The example choke 168 includes a rod 170 disposed in the aperture 160. In the illustrated example, an end 172 of the rod 170 extends into the counterbore 166, and a stop 174 (e.g., a retainer clip) is coupled to the end 172 of the rod 170. A diameter of the stop 174 is greater than a diameter of the aperture 160 to prevent the choke 168 from being accidentally removed from the bonnet 150 when the choke 168 is moved away from the piston 132 (i.e., upward in the orientation of FIG. 1).

The example choke 168 also includes a head or knob 176 at an end 178 of the rod 170 opposite the end 172 disposed in the piston bore 128. In the illustrated example, the head 176 is disposed outside of the bonnet 150 (i.e., in an ambient environment). In some examples, the head 176 is hexagonal to enable a user to operate the choke 168 manually by hand and/or with a tool such as, for example, a wrench. In the illustrated example, the rod 170 includes male threads 180 adjacent the head 176, and the aperture 160 includes female threads 182 to receive the male threads 180 of the rod 170.

The rod 170 includes a first seal 184 (e.g., an o-ring) and a second seal 186 (e.g., an o-ring). In the illustrated example, the first seal 184 is disposed along a length of the rod 170 between the piston bore 128 and the inlet 162. The second seal 186 is disposed along the length of the rod 170 between the inlet 162 and the head 176 of the choke 168. The second seal 186 provides a fluid seal between the inlet 162 and the ambient environment. In the illustrated example, the rod 170 also includes a channel or relief 187 disposed along the length of the rod 170 between the first seal 184 and the second seal 186. As described in greater detail below, the first seal 184 may prevent fluid from flowing from the inlet 162 into the piston bore 128.

In FIG. 1, the choke 168 is in a first position where the choke 168 disables or prevents a supply of fluid from the inlet 162 to the piston bore 128. To move the choke 168 to the first position, the choke 168 is moved relative to the housing 126 upward in the orientation of FIG. 1 to dispose the first seal 184 within the aperture 160 between the inlet 162 and the piston bore 128. When the first seal 184 is disposed in the aperture 160, the first seal 184 provides a fluid seal between the inlet 162 and the piston bore 128, thereby disabling the supply of fluid from the inlet 162 to the piston bore 128. As a result, the piston 132 is prevented from moving via the fluid, and the spring 148 urges the piston 132 away from the valve 104 to seat the plug 122 of the stem 118 against the valve seat 124.

The example choke 168 includes a lock 188 to hold or lock the choke 168 in the first position. In the illustrated example, the rod 170 includes an aperture 190 extending substantially perpendicular to a longitudinal axis of the rod 170. The aperture 190 is disposed below the male threads 180 in the orientation of FIG. 1. In the illustrated example, the lock 188 includes a pin or key 192 (e.g., a cotter pin) inserted into the aperture 190. In some examples, the pin 192 is coupled to the valve 104 or the actuator assembly 102 via, for example, a wire or a rope (not shown). The pin 192 extends through both ends of the aperture 190 to enable the pin 192 to support the choke 168 via the exterior surface 164 of the bonnet 150 and lock the choke 168 in the first position. The pin 192 and the aperture 190 are merely one example lock 188 and any other suitable lock may be used without departing from the scope of this disclosure.

Figure 2:
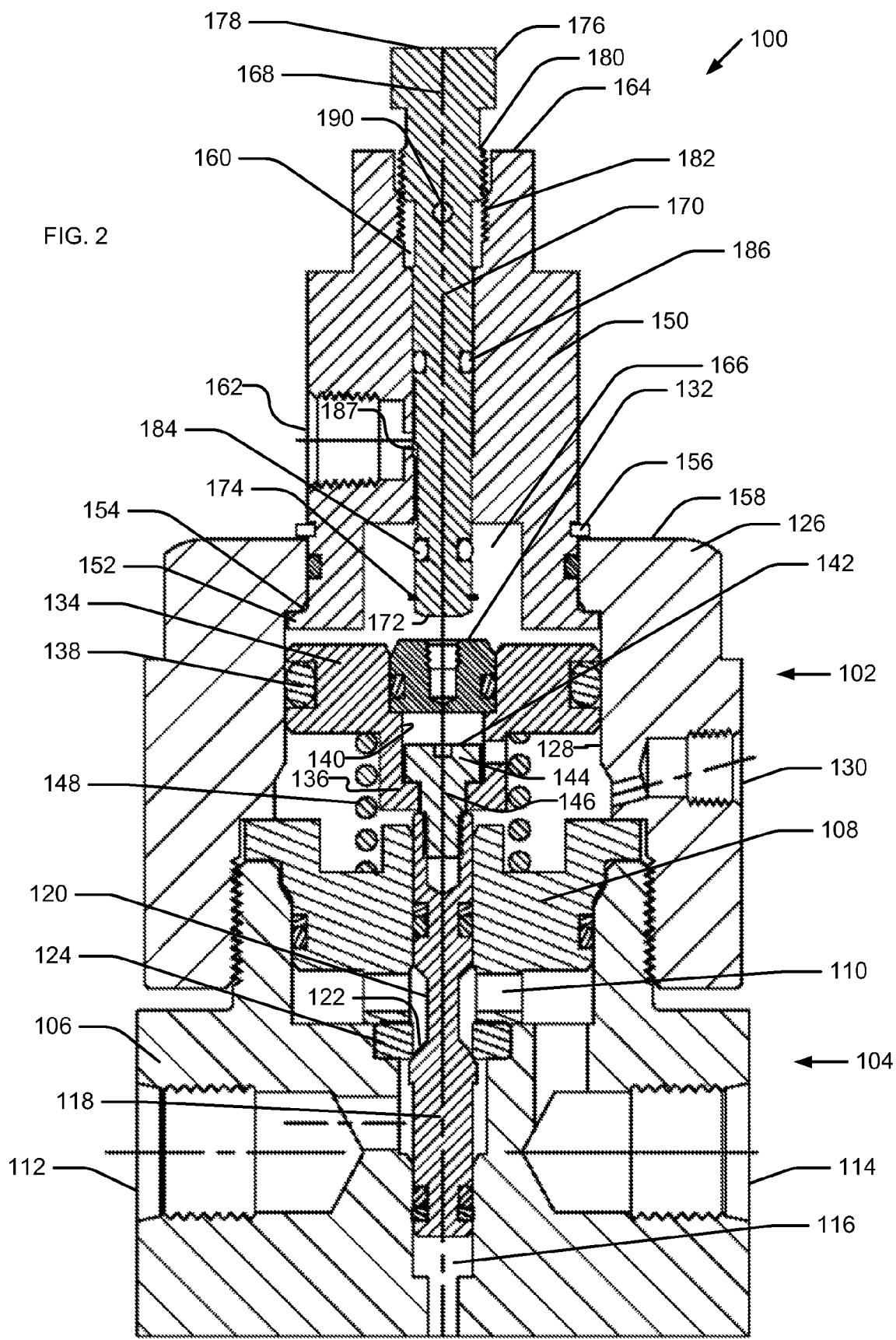
FIG. 2 depicts a cross-sectional view of the example process control device of FIG. 1 with the example choke in a second position.

In FIG. 2, the choke 168 is in a second position where the choke 168 enables fluid to flow from the inlet 162 to the piston bore 128. To move the choke 168 from the first position to the second position, the pin 192 is removed from the aperture 190 and the choke 168 is moved (e.g., slid) toward the piston 132 to a position where the choke 168 is supported on a top of the female threads 182 of the bonnet 150 via the male threads 180. As a result, the first seal 184 unseats from the bonnet 150 and moves into in the counterbore 166 of the bonnet 150. Thus, when the choke 168 is in the second position, the first seal 184 does not form a fluid seal between the inlet 162 and the piston bore 128 and the choke 168 is not in contact with the piston 132. Also, the relief 187 extends from the inlet 162 to the counterbore 166 when the choke 168 is in the second position. Thus, the choke 168 in the second position enables the fluid to flow from the inlet 162 into the piston bore 128, and the piston 132 may move via the fluid.

Figure 3:
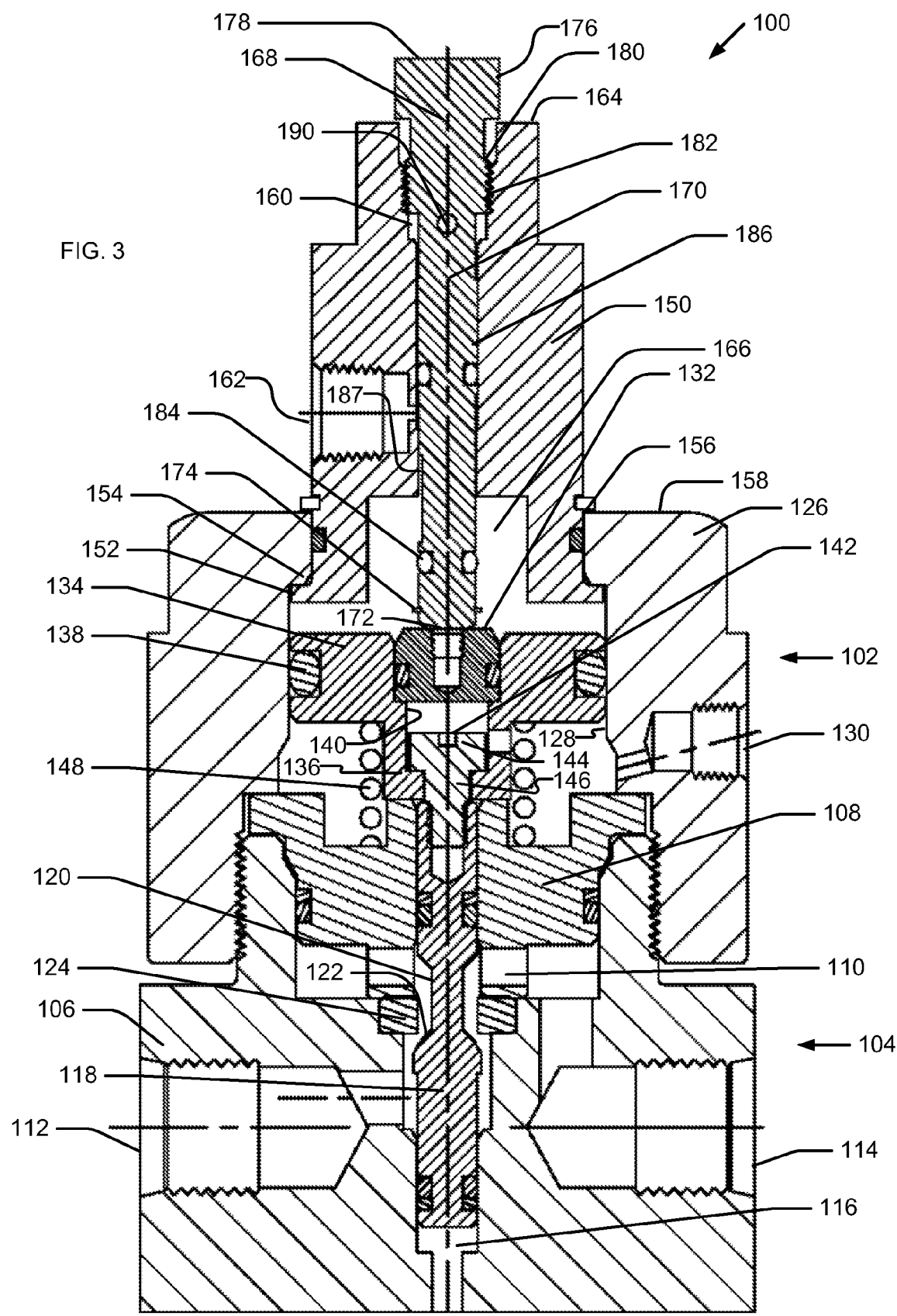
FIG. 3 depicts a cross-sectional view of the example process control device of FIG. 1 with the example choke in a third position.

FIG. 3 illustrates the example choke 168 in a third position where the choke 168 is operatively coupled to the piston 132. To move the choke 168 from the second position to the third position, the choke 168 is moved toward the piston 132 by threading the male threads 180 into the female threads 182 of the bonnet 150. When the choke 168 is in the third position, the end 172 of the rod 170 contacts the piston 132. When the rod 170 is in contact with the piston 132, the spring 148 urges the piston 132 against the rod 170 to operatively couple the choke 168 to the piston 132. A user may then move the piston 132 and, thus, the stem 118 by threading or unthreading the choke 168 (i.e., moving the choke 168 up or down in the orientation of FIG. 3). In the illustrated example, the threads 180 and 182 enable a user to adjust a position of the choke 168 over a distance corresponding to a stroke of the piston 132. In some examples, the choke 168 is threaded or unthreaded manually (i.e., by hand, using a wrench, etc.). The threads 180 and 182 may also enable the choke 168 to hold the piston 132 in a desired position (e.g., a fully open position).

Thus, a user may actuate and control the valve 104 using the choke 168 or the fluid. In some examples, the choke 168 is used to operate the valve 104 if the fluid supply is blocked or restricted (FIG. 3). In some examples, the choke 168 may be used to manually override the fluid supply by disabling the fluid supply (FIG. 1) or by moving the piston 132 (FIG. 3). The choke 168 may also enable the valve 104 to be operated via the fluid (FIG. 2).

Figure 4:
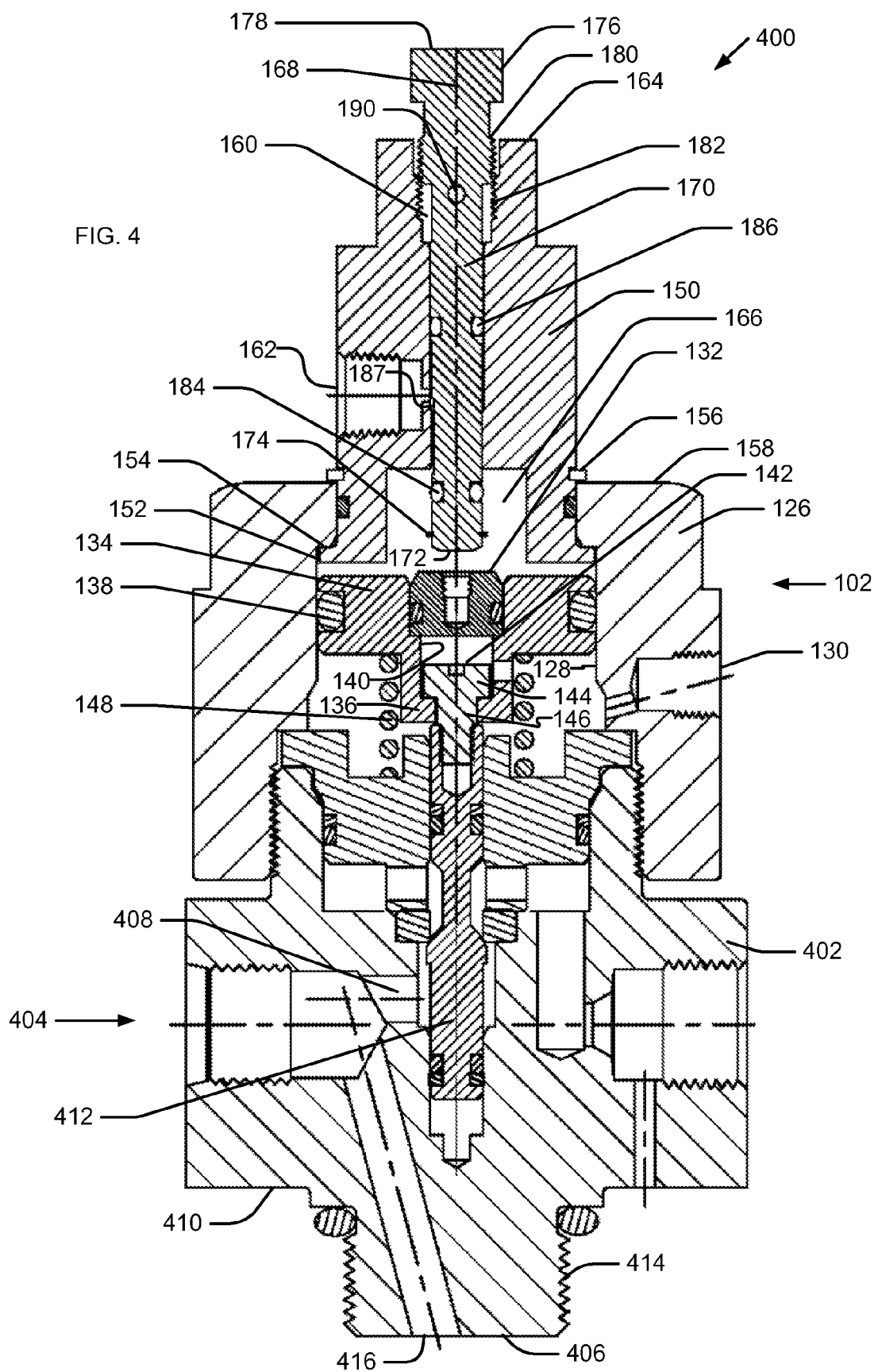
FIG. 4 depicts a cross-sectional view of another example process control device including the example apparatus.

FIG. 4 illustrates another example process control device 400 including the example actuator assembly 102 of FIGS. 1-3. In FIG. 4, the example actuator assembly 102 is coupled (e.g., threaded) to a valve body 402 of another example valve 404 (e.g., a bi-directional flow valve). In the illustrated example, the valve body 402 includes a male inlet connection 406 to fluidly couple a fluid flow passageway 408 of the example valve 404 to a cylinder (e.g., a pipe) (not shown). For example, the male inlet connection 406 extends outwardly (i.e., downwardly in the orientation of FIG. 4) from an exterior surface 410 of the valve body 402 perpendicular to a longitudinal axis of a stem 412 of the valve 404 and includes male threads 414. The male inlet connection 406 also includes a port 416 to fluidly couple the cylinder to the fluid flow passageway 408.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus comprising:
a bonnet to couple to a fluid valve, the bonnet having a first opening, a second opening and a third opening, the first opening being axially aligned with the second opening to define an aperture through the bonnet, and the third opening being non-parallel relative to the first and second openings; and
a rod positioned within the aperture of the bonnet, the rod having a first end adjacent the first opening of the bonnet and a second end adjacent the second opening of the bonnet, the rod being movable within the aperture along a longitudinal axis of the rod, the rod having a recessed portion along a body of the rod between the first end and the second end, the rod being movable relative to the bonnet between at least:
a first position to prevent a supply fluid in the third opening from flowing to the second opening of the bonnet;
a second position to allow the supply fluid in the third opening to flow between the third opening and the second opening via the recessed portion of the rod, the second end of the rod extending a first distance from the second opening of the bonnet when the rod is in the second position; and
a third position where the second end of the rod extends a second distance from the second opening of the bonnet, the second distance being greater than the first distance, the rod to engage a flow control member assembly of the fluid valve when the rod is in the third position and the bonnet is coupled to the fluid valve, and the rod to disengage from the flow control member assembly when the rod is in the first and second positions.

2. The apparatus of claim 1, wherein the rod further comprises a first seal positioned between the first end and the second end and a second seal positioned between the first end and the first seal, the first seal being spaced apart from the second seal in a direction along the longitudinal axis of the rod.

3. The apparatus of claim 2, wherein the first and second seals trap the supply fluid in the third opening from flowing to the second opening when the rod is in the first position.

4. The apparatus of claim 2, wherein the second seal prevents the supply fluid from flowing between the third opening of the bonnet and the first opening of the bonnet.

5. The apparatus of claim 1, wherein the rod is manually movable.

6. The apparatus of claim 1, wherein the first end of the rod extends from the first opening of the bonnet to expose a hole through the body of the rod that is non-parallel relative to the longitudinal axis of the rod when the rod is in the first position.

7. The apparatus of claim 6, further comprising a pin removably coupled to the hole of the rod, the pin to lock the position of the rod in the first position and prevent the rod from moving to the second or third positions when the pin is positioned in the hole.

8. The apparatus of claim 7, wherein the pin is removed from the hole to enable movement of the rod to the second and third positions.

9. The apparatus of claim 1, wherein the first end of the rod comprises a threaded portion.

10. The apparatus of claim 9, wherein the first opening of the bonnet comprises a threaded portion to threadably engage the threaded portion of the rod when the rod is moved from the second position to the third position.

11. The apparatus of claim 10, wherein the rod is adjustable over a distance corresponding to a stroke length of a piston by threading or unthreading the threaded portion of the rod and the rod engages the piston when in the third position.

12. An apparatus, comprising:
a regulator body having a passageway defining an inlet and an outlet, the outlet being in fluid communication with a sensing chamber defined by the regulator body;
a flow control member positioned in the passageway to control fluid flow between the inlet and the outlet;
a housing coupled to the regulator body, the regulator body and the housing defining a bore;
a piston disposed in the bore and coupled to the flow control member;
a bonnet coupled to the housing having an aperture axially aligned with the flow control member, the bonnet having a supply inlet non-parallel relative to the aperture and in fluid communication with the aperture of the bonnet; and
a rod movably coupled to the bonnet via the aperture, the rod movable between a first position to prevent fluid flow between the supply inlet and the bore, a second position to enable fluid flow between the supply inlet and the bore such that a supply fluid in the supply inlet imparts a force to the piston, and a third position to engage the piston and move the flow control member in the passageway, the rod being disengaged from the piston when the rod is in the first and second positions.

13. The apparatus of claim 12, wherein the rod includes a first seal to prevent fluid flow between the supply inlet and the bore when the rod is in the first position.

14. The apparatus of claim 13, wherein movement of the rod toward the bore causes the first seal to move away from the supply inlet to enable the supply fluid to flow into the bore.

15. The apparatus of claim 13, wherein the rod includes a second seal to prevent fluid flow between the supply inlet and the atmosphere via the aperture.

16. The apparatus of claim 12, wherein the rod comprises a hole to receive a lock to hold the rod in the first position.

17. The apparatus of claim 12, further comprising a spring to urge the piston in a first direction toward the rod.

18. The apparatus of claim 12, wherein the rod is manually movable.

19. The apparatus of claim 12, wherein movement of the rod to the third position causes the piston to move the flow control member to an open position to allow fluid flow through the passageway of the regulator body between the inlet and the outlet.

20. An apparatus comprising:
  means for defining a fluid flow passageway defining an inlet and an outlet, the outlet being in fluid communication with means for sensing an outlet pressure defined by the means for defining the fluid flow passageway;
  means for controlling a process fluid between the inlet and the outlet positioned in the means for defining the fluid flow passageway;
  means for actuating coupled to the means for defining the fluid flow passageway, the means for actuating having means for moving the means for controlling the process fluid; and
  means for housing coupled to the means for actuating, the means for housing and the means for actuating defining means for retaining a supply fluid, the means for housing having means for controlling the supply fluid between a supply inlet of the means for housing and the means for retaining the supply fluid, the means for controlling the supply fluid being slidably coupled to the means for housing, the means for controlling the supply fluid to move between a first position to prevent supply fluid flow between the supply inlet and the means for retaining the supply fluid, a second position to allow supply fluid flow between the supply inlet and the means for retaining the supply fluid, and a third position to engage the means for moving to move the means for controlling the process fluid, the means for controlling the supply fluid being disengaged from the means for moving and means for controlling the process fluid when the means for controlling the supply fluid is in the first and second positions.

\* \* \* \* \*